United States Patent Office 3,347,860
Patented Oct. 17, 1967

3,347,860
BIS-(PHENOXYACETYL)-PIPERAZINES
Tsutomu Irikura, Kuniyasu Masuzawa, and Keigo Nishino, Tokyo, Japan, assignors to Kyorin Seiyaku Kabushiki Kaisha, Tokyo, Japan
No Drawing. Filed Jan. 27, 1965, Ser. No. 428,545
Claims priority, application Japan, July 31, 1964, 39/43,700
4 Claims. (Cl. 260—268)

This invention relates to piperazine derivatives expressed by the following general formula, and to processes for preparing the same.

$$X-O-CH_2-CO-N\begin{pmatrix}CH_2-CH_2\\CH_2-CH_2\end{pmatrix}N-CO-CH_2-O-X$$

where X represents the group $$\begin{array}{c}R_1 \quad\quad R_2\\ \phantom{x}\\ R_3\end{array}$$

in which the designations of $R_1$, $R_2$ and $R_3$, as a whole, is shown by any of the following, $R_1=R_2=R_3=H$
$R_1=R_2=H$ and $R_3=CONH_2$
$R_1=H$, $R_2=OR$ and $R_3=COOR'$
$R_1=R_2=H$ and $R_3=OH$
$R_1=R_2=H$ and $R_3=R$
$R_1=R_2=H$ and $R_3=OR$
$R_1=R_2=R_3=OR$, R and R' standing for the same or different alkyl radicals.

The compounds of this invention can be prepared by two processes which are described in generalized forms as follows.

Process A:

$$X-OH + Hal-CH_2-CO-N\begin{pmatrix}\\\end{pmatrix}N-CO-CH_2-Hal \longrightarrow$$

$$X-O-CH_2-CO-N\begin{pmatrix}\\\end{pmatrix}N-CO-CH_2-O-X$$

where the X representation is the same as above and Hal stands for a halogen atom.

Namely, a phenol, expressed by X—OH, is converted with metallic sodium or an alkali into the corresponding phenolate. The final compound is readily synthesized by condensation of the phenolate with 1,4 - bis - haloacetyl piperazine.

Process B:

$$\begin{array}{c}X-OCH_2-CO\\X-OCH_2-CO\end{array}\!\!\!\!\!\!>O \quad\quad\quad \begin{array}{c}X-OCH_2-CO-hal\\HN\begin{pmatrix}\\\end{pmatrix}NH\end{array}$$

or $X-OCH_2-COOR''$ or $HN\begin{pmatrix}\\\end{pmatrix}NH\cdot 6H_2O$ $$\longrightarrow X-O-CH_2-CO-N\begin{pmatrix}\\\end{pmatrix}N-CO-CH_2-H-X$$

where X and Hal are as previously defined and R" represents an alkyl radical.

Namely, carbonyl derivatives, such as, for example, alkyl ester, acid halide, acid anhydride, etc., of aryl glycollic acid shown above is subjected to reaction with piperazine or piperazine hydrate in acetone or aromatic hydrocarbon as solvent, to obtain the final compound.

Novel acetylpiperazine derivatives, as expressed in the general formula, are useful pharmacological compounds in that they possess highly efficacious depressive action to the central nervous system and analgesic and antitussive actions.

Illustrated below is the analgesic effect which some of the compounds of this invention can display, as measured by the pressure method as well as the D'amour Smith method, or heat ray stimulation method, against mouse tails. Of course, this invention shall not be limited to the following compounds.

| Number | Compound | Pressure method relative to— | | D'amour Smith Method $ED_{50}$ (mg./kg.) |
|---|---|---|---|---|
| | | Codeine=1 | Sulpyrin=1 | |
| 1 | ⌬—OCH₂—CON⟨⟩NCOCH₂—O—⌬ | 1.021 | 5.897 | |
| 2 | ⌬(CONH₂)—OCH₂—CON⟨⟩NCOCH₂—O—⌬(CONH₂) | 0.517 | | |
| 3 | C₂H₅OOC—⌬(OCH₃)—OCH₂—CON⟨⟩NCOCH₂—O—⌬(OCH₃)—COOC₂H₅ | 0.953 | 4.75 | |
| 4 | ⌬(OCH₃)—OCH₂—CON⟨⟩NCOCH₂—O—⌬(OCH₃) | 0.121 | | |
| 5 | ⌬(OCH₃)—OCH₂—CON⟨⟩NCOCH₂—O—⌬(OCH₃) | 0.944 | 5.260 | |
| 6 | CH₃O—⌬—OCH₂—CON⟨⟩NCOCH₂—O—⌬—OCH₃ | 0.823 | 7.599 | |
| 7 | ⌬(CH₃)—OCH₂—CON⟨⟩NCOCH₂—O—⌬(CH₃) | 0.76 | 5.26 | 28.5 |

| Number | Compound | Pressure method relative to— | | D'amour Smith Method $ED_{50}$ (mg./kg.) |
|---|---|---|---|---|
| | | Codeine=1 | Sulpyrin=1 | |
| 8 | (structure: 2-CH₃ phenoxy — OCH₂—CON⟩N⟨COCH₂—O— phenoxy 2-CH₃) | 0.84 | 5.88 | 25.5 |
| 9 | (structure: 4-CH₃ phenoxy — OCH₂—CON⟩N⟨COCH₂—O— phenoxy 4-CH₃) | 0.67 | 4.62 | 32.5 |
| 10 | (structure: 2-C₂H₅ phenoxy —OCH₂—CON⟩N⟨COCH₂—O— phenoxy 2-C₂H₅) | | | 153 |
| 11 | (structure: 4-C₂H₅ phenoxy —OCH₂—CON⟩N⟨COCH₂—O— phenoxy 4-C₂H₅) | 0.13 | 0.88 | 171 |
| 12 | (structure: 4-C₃H₇ phenoxy —OCH₂—CON⟩N⟨COCH₂—O— phenoxy 4-C₃H₇) | 1.151 | 7.687 | |
| 13 | (structure: 3,4,5-tri-OCH₃ phenoxy —OCH₂—CON⟩N⟨COCH₂—O— phenoxy 3,4,5-tri-OCH₃) | 0.16 | 1.06 | 263 |
| 14 | (structure: 2-OH phenoxy —OCH₂—CON⟩N⟨COCH₂—O— phenoxy 2-OH) | | | >200 |

The present invention is further illustrated by the following examples.

EXAMPLE 1

*1,4-bis(phenoxyacetyl)piperazine*

In 150 ml. of ethanol was dissolved 1.15 g. of metallic sodium. The solution was then mixed with 4.71 g. of phenol and further with 5.98 g. of 1,4-bis(chloroacetyl)piperazine. The mixture was heated under stirring until it became neutral. After the reaction was completed, the crystalline substance formed was removed by filtration, and washed with water. Recrystallization from dimethylformamide gave 6.3 g. (71.1%) of the final compound, M.P. 203–204° C.

*Analysis.*—Calculated for $C_{20}H_{22}O_4N_2$: C, 67.78; H, 6.26; N, 7.90. Found: C, 67.87; H, 6.39; N, 7.87.

EXAMPLE 2

*1,4-bis[(2-carbamoylphenoxy)acetyl] piperazine*

To 100 ml. of absolute ethanol in which 2.3 g. of metallic sodium was dissolved, 13.7 g. of salicylamide was added. The solution was then mixed with 12.0 g. of 1,4-bis(chloroacetyl)piperazine, and heated at 80° C. on a steam bath for 8 hours until crystals were formed and the reaction mixture became neutral. The crystals were separated while hot by filtration, washed with 500 ml. of water, then with a 5% solution of NaOH, and again with water. Recrystallization from hot alcohol gave 16.0 g. (72.8%) of white crystalline powder, M.P. 278–280° C. (decomposed).

*Analysis of N.*—Calculated for $C_{22}H_{24}N_4O_6$ 12.72%. Found: 12.68%.

EXAMPLE 3

*1,4-bis[(2-methoxy-4-carbethoxyphenoxy)acetyl] piperazine*

To 150 ml. of ethanol in which 2.3 g. of metallic sodium was dissolved was added 19.6 g. of ethyl vanillate. The solution was then mixed with 11.95 g. of 1,4-bis(chloroacetyl) piperazine, and heated under stirring until the solution became neutral. The reaction mixture was filtered while hot. White crystals were precipitated from the filtrate as it cooled. The crystals were separated by filtration, washed with a large amount of water, kept to stand for a while, then washed with solutions of 5% HCl and 5% NaOH and finally with water successively. Recrystallization from dimethylformamide gave 18.7 g. (67.1%) of the final compound, M.P. 205° C.

*Analysis.*—Calculated for $C_{28}H_{34}N_2O_{10}$: C, 60.21; H, 6.14; N, 5.02%. Found: C, 60.10; H, 6.00; N, 5.28%.

EXAMPLE 4

*1,4-bis[(2-methoxyphenoxy)acetyl]piperazine*

By following the same process as described in the preceding example, the final compound was obtained employing 2.3 g. of metallic sodium, 200 ml. of ethanol and 12.4 g. of 2-methoxyphenol at the starting step. Recrystallization from ethanol gave 16.5 g. (79.6%) of the compound, M.P. 170–172° C.

*Analysis.*—Calculated for $C_{22}H_{26}O_6N_2$: C, 63.75; H, 6.32; N, 6.76%. Found: C, 63.57; H, 6.43; N, 6.79%.

EXAMPLE 5

*1,4-bis[(3-methoxyphenoxy)acetyl]piperazine*

By following the same process as described in the foregoing examples, the final compound was obtained from 2.3 g. of metallic sodium, 200 ml. of ethanol, 12.4 g. of resorcin monomethylether and 11.95 g. of 1,4-bis(chloroacetyl)piperazine. Recrystallization from ethanol gave 12.6 g. (60.8%) of the compound, M.P. 153–154° C.

*Analysis.*—Calculated for $C_{22}H_{26}O_6N_2$: C, 63.75; H, 6.32; N, 6.76%. Found: C, 63.79; H, 6.06; N, 6.72%.

EXAMPLE 6

*1,4-bis[(4-methoxyphenoxy)acetyl]piperazine*

By following the same process as described in the foregoing examples, the final compound was obtained from 1.67 g. of metallic sodium, 300 ml. of ethanol, 9 g. of hydroquinone monomethylether and 8.68 g. of 1,4-bis(chloroacetyl)piperazine. Recrystallization from dioxane gave 14.8 g. (71.5%) of the compound, M.P. 168–169° C.

*Analysis.*—Calculated for $C_{22}H_{26}O_6N_2$: C, 63.75; H, 6.32; N, 6.76%. Found: C, 63.53; H, 6.44; N, 6.96%.

EXAMPLE 7

*1,4-bis[(2-methylphenoxy)acetyl]piperazine*

By following the same process as described in the foregoing examples, the final compound was obtained from 2.3 g. of metallic sodium, 200 ml. of ethanol, 10.8 g. of o-cresol, and 11.95 g. of 1,4-bis(chloroacetyl)piperazine. Recrystallization from chloroform and ethanol gave 12.8 g. (67%) of the compound, M.P. 171–173° C.

*Analysis.*—Calculated for $C_{22}H_{26}O_4N_2$: C, 69.09; H, 6.85; N, 7.33%. Found: C, 69.30; H, 6.85; N, 7.36%.

EXAMPLE 8

*1,4-bis[(3-methylphenoxy)acetyl]piperazine*

The final compound was obtained by following the same process as in Example 7, except that m-cresol was employed instead of o-cresol. Yield, 13.7 g. (71.6%); M.P. 140–142° C.

*Analysis.*—Calculated for $C_{22}H_{26}O_4N_2$: C, 69.09; H, 6.85; N, 7.33%. Found: C, 69.27; H, 6.80; N, 7.17%.

EXAMPLE 9

*1,4-bis[(4-methylphenoxy)acetyl]piperazine*

The final compound was obtained by following the same process as in Example 7, except that 10.8 g. of p-cresol was employed instead of o-cresol. Recrystallization from dimethylformamide and chloroform yielded 13.2 g. (69.1%) of the compound, M.P. 193–195° C.

*Analysis.*—Calculated for $C_{22}H_{26}O_4N_2$: C, 69.09; H, 6.85; N, 7.33%. Found: C, 69.85; H, 6.75; N, 7.22%.

EXAMPLE 10

*1,4-bis[(3-ethylphenoxy)acetyl]piperazine*

The final compound was obtained by following the same process as in Example 7, except that 12.2 g. of m-ethylphenol was employed instead of o-cresol. Yield, 14.9 g. (72.7%); M.P. 142–144° C.

*Analysis.*—Calculated for $C_{24}H_{30}O_4N_2$: C, 70.22; H, 7.27; N, 6.82%. Found: C, 70.21; H, 7.24; N, 6.87%.

EXAMPLE 11

*1,4-bis[(4-ethylphenoxy)acetyl]piperazine*

The final compound was obtained by following the same process as in Example 7, except that 12.2 g. of 4-ethylphenol was employed instead of o-cresol. Recrystallization from dimethylformamide yielded 16.8 g. (82.2%) of the compound, M.P. 189–190 C.

*Analysis.*—Calculated for $C_{24}H_{30}O_4N_2$: C, 70.22; H, 7.27; N, 6.82%. Found: C, 70.10; H, 7.27; N, 6.91%.

EXAMPLE 12

*1,4-bis[(4-propylphenoxy)acetyl]piperazine*

To a mixture of 0.85 g. of metallic sodium, 100 ml. of ethanol and 5 g. of p-propylphenol, was added 4.4 g. of 1,4-bis(chloroacetyl)piperazine. The solution was heated under stirring until it became neutral. Crystals formed were separated by filtration, washed with water and then recrystallized from ethanol. Yield, 6.2 g. (76.9%); M.P. 168–169° C.

*Analysis.*—Calculated for $C_{26}H_{34}O_4N_2$: C, 71.20; H, 7.82; N, 6.39%. Found: C, 71.49; H, 7.72; N, 6.23%.

EXAMPLE 13

*1,4-bis[(3,4,5-trimethoxyphenoxy)acetyl]piperazine*

To a mixture of 3.0 g. of 3,4,5-trimethoxyphenol, 0.4 g. of metallic sodium and 50 ml. of ethanol, was added 2.0 g. of 1,4-bis(chloroacetyl)piperazine. The solution was treated in the same procedure as described in the foregoing examples. Recrystallization from chloroform gave 2.5 g. (57.5%) of the final compound, M.P. 205° C.

*Analysis.*—Calculated for $C_{22}H_{32}O_{10}N_2$: C, 58.42; H, 6.27; N, 5.24%. Found: C, 58.45; H, 6.27; N, 5.34%.

EXAMPLE 14

*1,4-bis[(2-hydroxyphenoxy)acetyl]piperazine*

The same process was followed as described in the foregoing examples, employing 2-hydroxyphenol as phenolic component. Recrystallization from dimethylformamide gave the final compound, yield, 53.9%, M.P. 255–256° C.

*Analysis.*—Calculated for $C_{20}H_{22}O_6N_2$: C, 62.16; H, 5.74; N, 7.25%. Found: C, 61.99; H, 5.47; N, 7.45%.

EXAMPLE 15

*1,4-bis[(2-hydroxyphenoxy)acetyl]piperazine*

The scheme of synthesis can be expressed as follows.

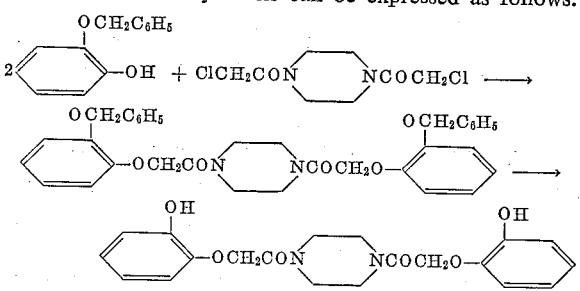

To 100 ml. of absolute ethyl alcohol in which 2.3 g. of metallic sodium was dissolved, were added 20 g. of o-monobenzylcatechol and 12 g. of 1,4-bis(chloroacetyl)piperazine. The stirred solution was heated for 8 to 10 hours under the atmosphere of nitrogen. The solution was let cool to deposit a crystalline substance, and filtered. The filtrate was evaporated to give a viscous matter which, by being treated with 50% alcohol, yielded crystals. Recrystallization from ethyl alcohol gave 13.7 g. of white crystals of 1,4-bis[(2-benzyloxyphenoxy)acetyl]piperazine, M.P. 127–129° C. Two and eight-tenth grams of the compound dissolved in 50 ml. of dioxane was shaken, in the presence of palladium black, with hydrogen at room temperature and under atmospheric pressure. About 180 ml. of hydrogen was absorbed. At the completion of the reaction 70 ml. of dimethylformamide was added, and the mixture was filtered while hot to remove the catalyser. Crystals precipitated were recrystallized from dimethylformamide to give 1.22 g. (63.1%) of white crystals of the final compound, M.P. 255–256° C.

*Analysis.*—Calculated for $C_{20}H_{22}O_6N_2$: C, 62.16; H, 5.74; N, 7.25%. Found: C, 61.99; H, 5.47; N, 7.45%.

EXAMPLE 16

*1,4-bis(phenoxyacetyl)piperazine*

To 100 ml. of acetone was added 11.4 g. (0.0586 mole) of piperazine hexahydrate. Ten grams (0.0586 mole) of phenoxyacetyl chloride was added dropwise to the stirred solution cooled with ice at 8 to 10° C. to form white crystals. The crystals were thoroughly washed successively with 200 ml. of 10% hydrochloric acid, 200 ml. of a 10% solution of NaOH, and finally with water. Recrystallization from dimethylformamide gave 7.3 g. (70.2%) of the final compound, M.P. 205° C.

*Analysis.*—Calculated for $C_{20}H_{22}O_4N_2$: C, 67.78; H, 6.26; N, 7.90%. Found: C, 67.97; H, 6.39; N, 7.87%.

EXAMPLE 17

*1,4-bis[(2-carbamoylphenoxy)acetyl]piperazine*

To a solution of 10.6 g. of 2-carbamoylphenoxyacetyl chloride in 100 ml. of acetone was added 9.7 g. of piperazine hexahydrate. The mixture was stirred at room temperature for 3 to 4 hours. Crystals precipitated were removed by filtration, and washed with solutions of 5% NaOH and 5% HCl, and finally with water successively in order to remove byproducts. Recrystallization from hot alcohol gave 2.0 g. (18.2%) of the final compound in white crystalline powder, M.P. 277–280° C.

EXAMPLE 18

*1,4-bis](2-methoxyphenoxy)acetyl]piperazine*

To a solution of 9.7 g. of piperazine hexahydrate in 100 ml. of acetone, was slowly added a solution of 10 g. of 2-methoxy-phenoxyacetyl chloride (B.P. at 10 mm., 120° C.) in 20 ml. of acetone dropwise under stirring at room temperature. The stirirng was continued for 2 to 3 hours. Crystals precipitated were filtered, and the filtrate was condensed at reduced pressure. The residue combined with the crystals was washed successively with solutions of 5% HCl and 5% NaOH, and finally with water. Recrystallization from alcohol gave 7.35 g. (71.0%) of the final compound in colorless crystals, M.P. 170–172° C.

Analysis of N.—Calculated for $C_{22}H_{26}O_6N_2$, 6.76%. Found: 6.80%.

EXAMPLE 19

*1,4-bis[(3-methoxyphenoxy)acetyl]piperazine*

To a solution of 9.7 g. of piperazine hexahydrate in 100 ml. of acetone, was slowly added a solution of 10 g. of 3-methoxyphenoxyacetyl chloride (B.P. at 10 mm., 127° C.) in 20 ml. of acetone dropwise under stirring at room temperature. The process then followed was the same as in Example 1. Recrystallization from dioxane gave 6.56 g. (63.4%) of the final compound in colorless crystalline powder, M.P. 153–154° C.

Analysis of N.—Calculated for $C_{22}H_{26}O_6N_2$, 6.76%. Found: 6.58%.

EXAMPLE 20

*1,4-bis[(4-methoxyphenoxy)acetyl]piperazine*

To a solution of 9.7 g. of piperazine hexahydrate in 100 ml. of acetone, was slowly added a solution of 10 g. of 4-methoxyphenoxyacetyl chloride (B.P. at 10 mm., 124° C.) in 20 ml. of acetone dropwise under stirring at room temperature. The process then followed was the same as in Example 1. Recrystallization from dioxane gave 7.03 g. (69.1%) of the final compound in colorless crystalline powder, M.P. 168–169° C.

Analysis of N.—Calculated for $C_{22}H_{26}O_6N_2$, 6.76%. Found: 6.83%.

What we claim is:

1. A compound of the formula

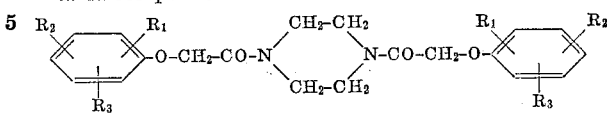

in which $R_1$, $R_2$ and $R_3$ are each selected independently from the group consisting of hydrogen, hydroxy, lower alkyl, lower alkoxy, carbamoyl and carbalkoxy in one of the following combinations:

$R_1=R_2=R_3=H$
$R_1=R_2=H$ and $R_3=CONH_2$
$R_1=H$, $R_2=OR$ and $R_3=COOR'$
$R_1=R_2=H$ and $R_3=OH$
$R_1=R_2=H$ and $R_3=R$
$R_1=R_2=H$ and $R_3=OR$; and
$R_1=R_2=R_3=OR$ in which each of R and R' is lower alkyl.

2. A compound of the formula

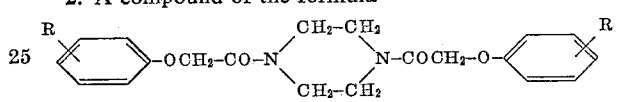

in which R is selected from the group consisting of hydrogen, hydroxy, lower alkyl, lower alkoxy and carbamoyl.

3. A compound of the formula

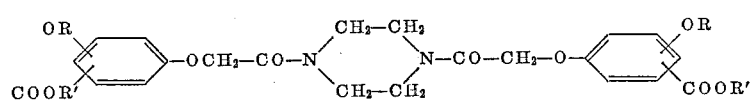

in which R and R' are the same or different lower alkyl.

4. A compound of the formula

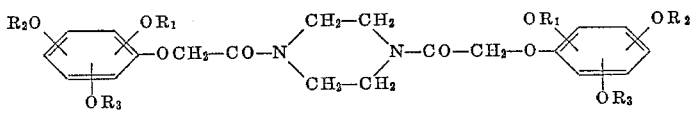

in which $R_1$, $R_2$ and $R_3$ are the same or different lower alkyl.

References Cited

UNITED STATES PATENTS 2,286,390  6/1942  Sparks _____ 260—268
3,010,996  11/1961  Litvan et al. _____ 260—559

OTHER REFERENCES

Irikura et al., J. Pharmaceutical Society of Japan, vol. 83 (1963), pages 785–91.

Irikura, Pharmaceutical Society of Japan, vol. 84, (8) (1964), pages 749–51.

HENRY R. JILES, *Primary Examiner.*